(No Model.) 4 Sheets—Sheet 1.
G. M. ENYEART.
CASH RECORDING DEVICE.
No. 432,388. Patented July 15, 1890.
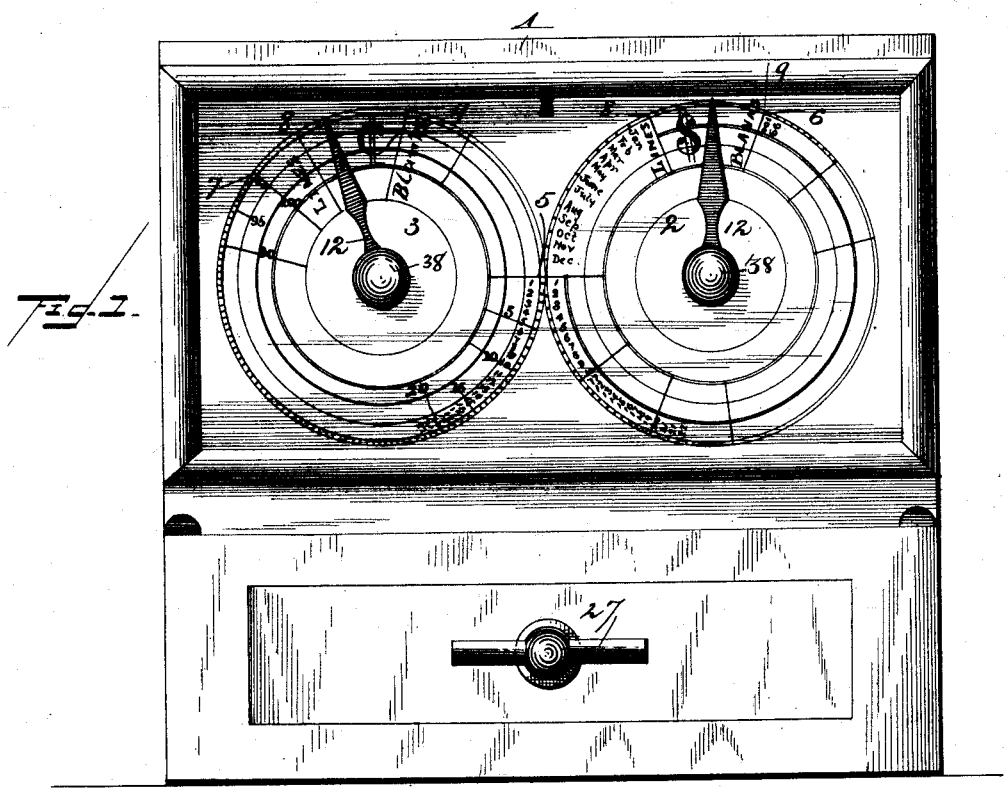
Fig. 1.
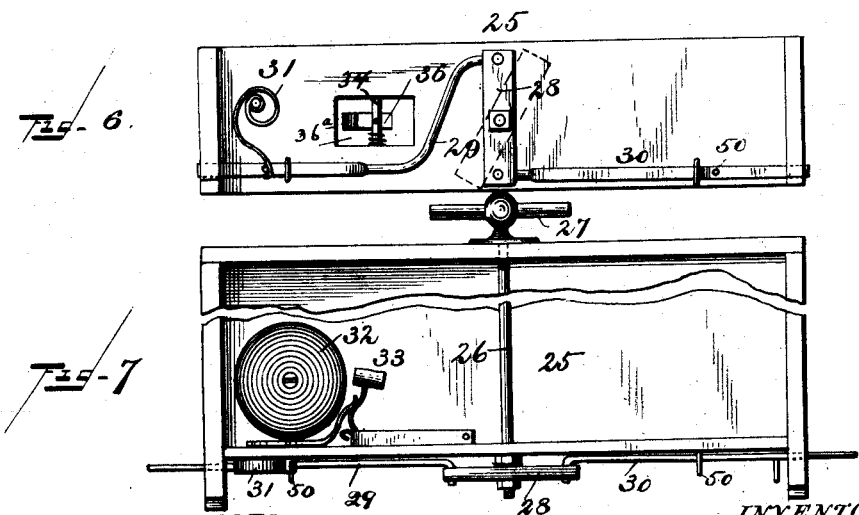
Fig. 6.
Fig. 7.
WITNESSES:
Franck L. Ourand
Jn° L. Loomis
INVENTOR:
George M. Enyeart,
by James Dagger & Co,
Attorneys

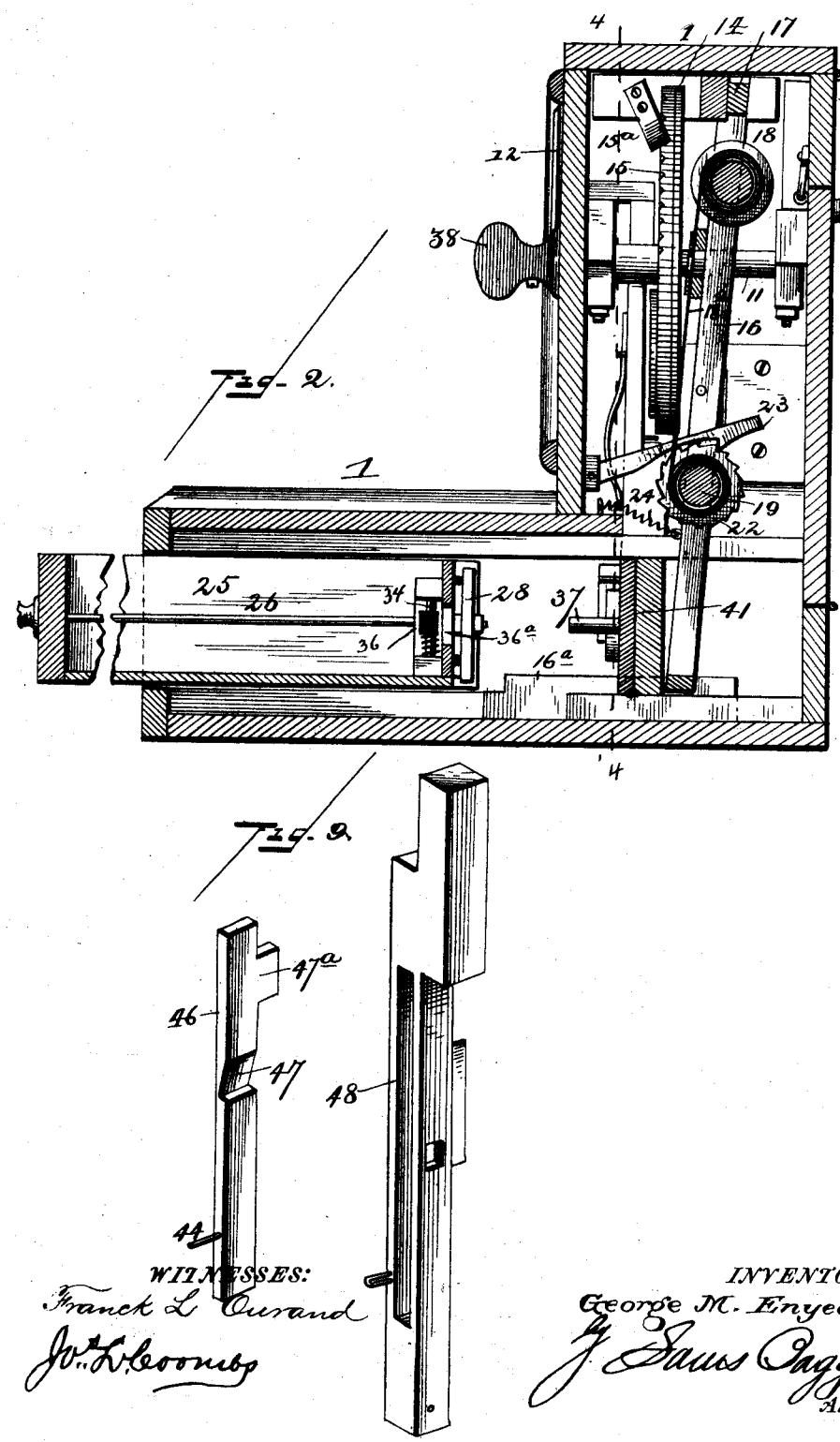

(No Model.) 4 Sheets—Sheet 3.

G. M. ENYEART.
CASH RECORDING DEVICE.

No. 432,388. Patented July 15, 1890.

WITNESSES:
F. L. Ouraud.
Jo. L. Coomby.

INVENTOR:
George M. Enyeart,
by Samus Jagger & Co.
Attorneys (No Model.) 4 Sheets—Sheet 4.
G. M. ENYEART.
CASH RECORDING DEVICE.
No. 432,388. Patented July 15, 1890.
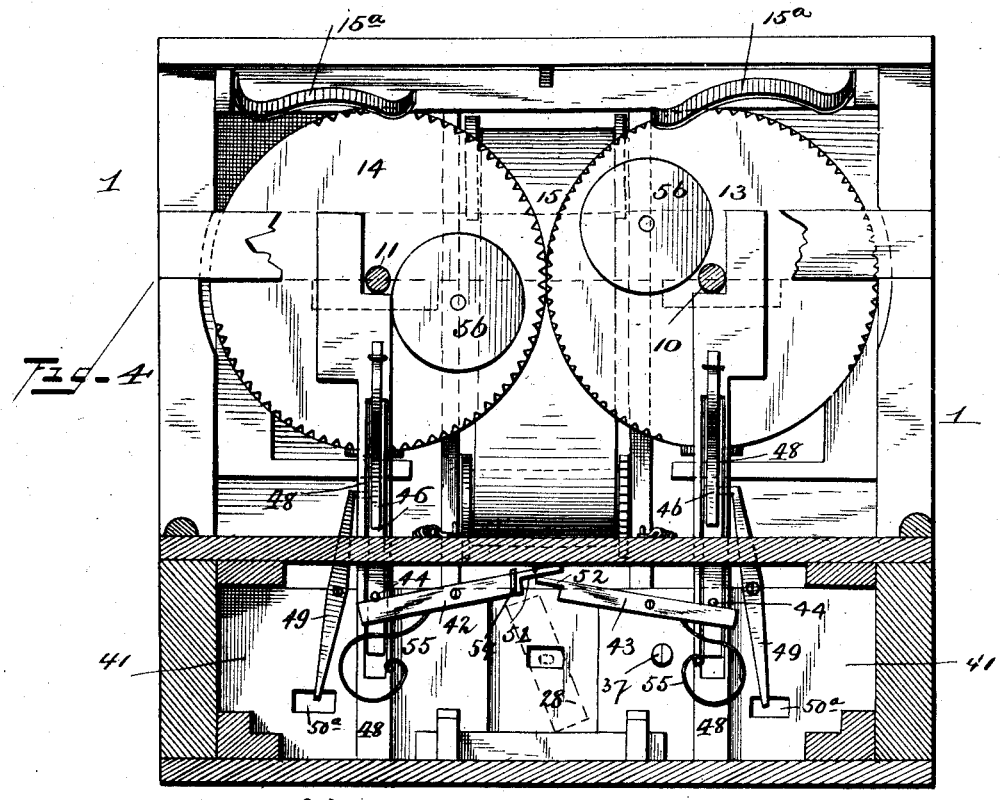
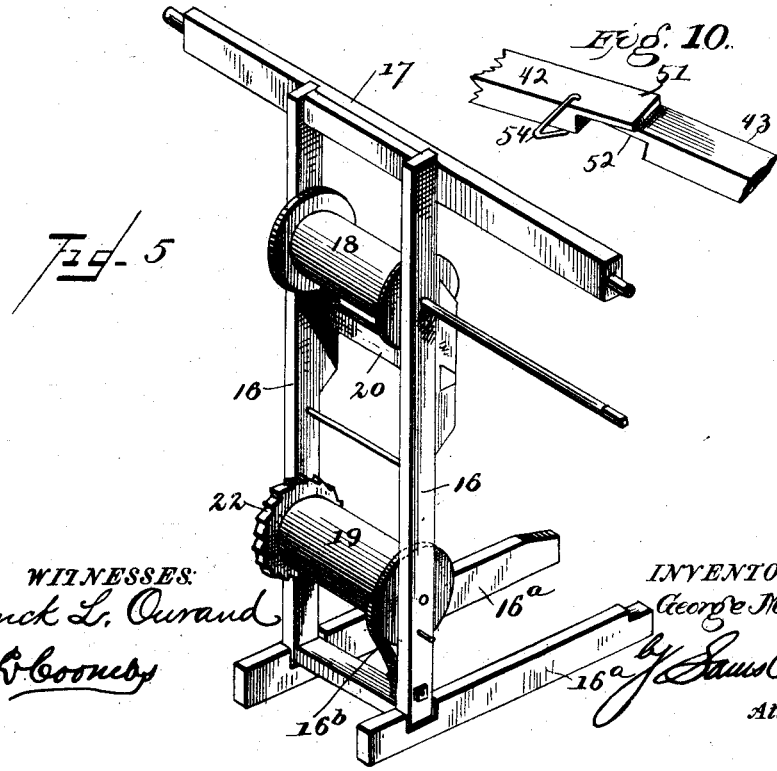
WITNESSES:
Franck L. Ourand
J. L. Coombs
INVENTOR:
George M. Enyeart
by James Bagger & Co.
Attorneys

UNITED STATES PATENT OFFICE.

GEORGE M. ENYEART, OF ORBISONIA, PENNSYLVANIA.

CASH-RECORDING DEVICE.

SPECIFICATION forming part of Letters Patent No. 432,388, dated July 15, 1890.

Application filed February 11, 1890. Serial No. 340,016. (No model.)

*To all whom it may concern:*

Be it known that I, GEORGE M. ENYEART, a citizen of the United States, and a resident of Orbisonia, in the county of Huntingdon and State of Pennsylvania, have invented certain new and useful Improvements in Cash-Recording Devices; and I do hereby declare that the following is a full, clear, and exact description of the invention, which will enable others skilled in the art to which it appertains to make and use the same.

My invention relates to improvements in cash-recording devices or apparatus, and is designed principally for use in retail stores where large numbers of small cash sales are made daily, although it is obvious that it may be employed in other establishments with equal advantage.

I am aware that cash-registering and cash-recording devices have heretofore been devised, some of which have gone into extensive public use and have proved to be very convenient to merchants, besides insuring security against the peculations of dishonest employés. These devices have been very complicated and costly, however, thus placing them beyond the reach of small dealers, whose sales would not justify the heavy expense.

The object of my invention is to provide a cash registering and recording apparatus which shall be simple and economical in construction, durable in use, not liable to get out of order, and in which the sums paid are not only indicated upon a dial in full view of the person paying the same, but are recorded or printed on a slip of paper, so that the aggregate sum of the sales may be cast up at the close of the day. The date of the sales can also be recorded on said slip.

The invention consists in the novel features of construction and new combinations of parts hereinafter fully described, and pointed out in the appended claims.

Figure 3:
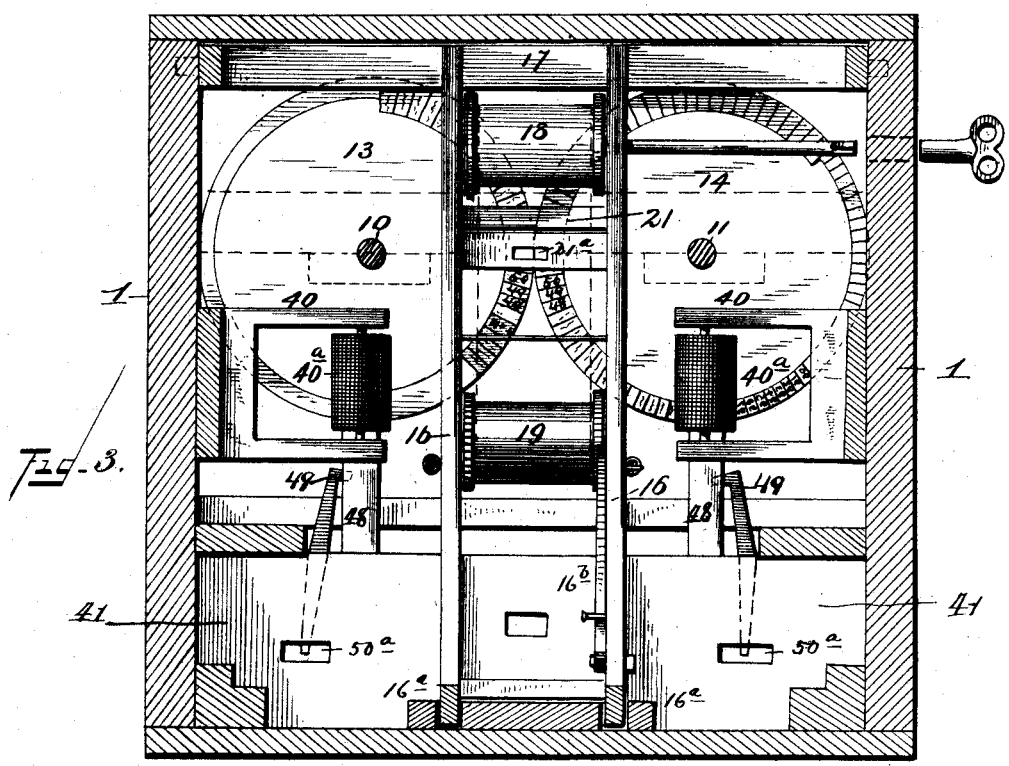
Figure 8:
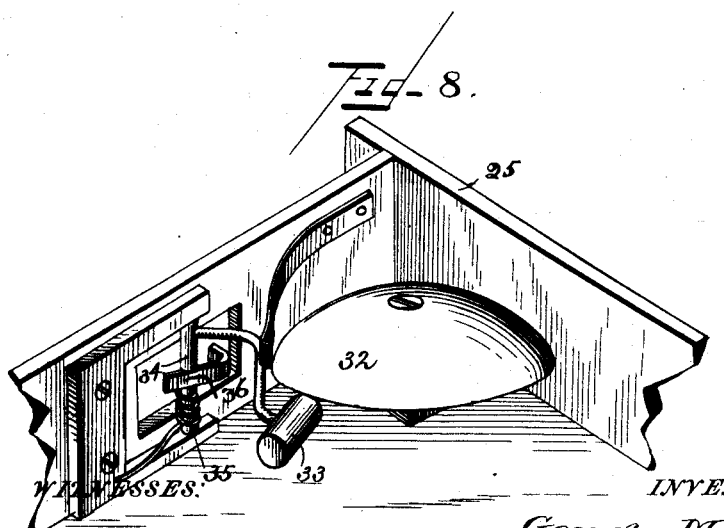

In the accompanying drawings, in which similar reference-numerals indicate corresponding parts in all the views, Figure 1 is a side elevation of an apparatus constructed according to my invention, showing the dials and pointers and the cash-drawer. Fig. 2 is a central longitudinal vertical section of the same. Fig. 3 is a vertical cross-section looking from the rear on line 3 3, Fig. 2. Fig. 4 is a horizontal section on line 4 4, Fig. 2. Fig. 5 is a perspective view of the paper-carriage. Fig. 6 is an end view of the cash-drawer. Fig. 7 is a plan view of the same. Fig. 8 is a perspective view of portion of the same. Figs. 9 and 10 are detail perspective views.

In the said drawings, the reference-numeral 1 designates the casing of the apparatus, which is substantially L-shaped in cross-section, the horizontal section carrying the cash or money drawer, while the vertical portion contains the mechanism for recording the sales.

In the front of the vertical portion of the casing, immediately above the horizontal section, are two dials 2 and 3. The dial 2, or the one to the right, I term the "dollars dial," while dial 3, to the left, I term the "cents dial," and they are so marked in any desired manner. The outer circle or edge of dial 2, beginning at the point marked 5 and ending at point 6, is provided with the numerals 1 to 100, arranged in consecutive order, and dial 3 is marked or numbered similarly, with the exception that the numerals run in a reverse direction—that is to say, they begin at the point 5 and end at point 7. Each dial is also marked or provided with two radial lines 8 and 9, marked, respectively, "Lines" and "Blanks." Immediately above the point 5 on dial 2 is arranged the names of the twelve calendar months in regular consecutive order, as seen in Fig. 1.

Pivoted in the front and rear walls of the vertical section of the casing and passing centrally through each dial are the shafts 10 and 11, each of which carries a pointer 12, rigidly fixed thereto. Rigidly fixed to each shaft within the said casing are the recording-wheels 13 and 14. These wheels turn with the shafts, and the rear face of each at its outer edge or rim is formed or provided with a series of type faces or characters in relief, corresponding exactly with the characters on the dials 2 and 3, except that they are arranged in reverse order—that is to say, the numbers on dial 2 increase from left to right, while the corresponding characters on its recording-wheel 13 increase or progress from right to left. The characters designating the months are also arranged in reverse order. On dial 3 the numerals increase in succession from right to left, while on recording-wheel 14 they increase oppositely from left to right. The recording-wheels are so arranged on their shafts relatively to the dial and pointer that when said pointer is turned to numeral 1 on the dial at the point 5 the corresponding numeral 1 on the recording-wheel will be in line therewith, and as said pointer is turned so as to point to any other numeral on the dial the corresponding numeral on the recording-wheel will be in line with numeral 1 on the dial, at which point the paper is pressed against the said character to receive the impression. The front face of each recording-wheel is provided with a series of notches 15, one of which is opposite each character on the wheel, and on each side of the casing is an inwardly-projecting spring-pawl 15$^a$, which engages with the notches as the said wheels are rotated and holds them in position.

The paper-frame, which carries the strip or web 18$^a$ upon which the sales are recorded or printed by the recording-wheels, consists of two depending bars 16 16, rigidly fixed to a cross-bar 17, pivoted in the upper ends of the sides of the vertical section of the casing 1. In the upper ends of these pivoted and swinging bars is journaled a roller 18, which carries the paper web which is wound thereupon, and at the lower ends of said bars is journaled a similar roller 19, upon which the paper is wound as the characters are printed. Intermediate of the rollers 18 and 19 is a cross-bar 20, secured to and projecting somewhat in front of the bars 16. Just in front of the cross-bar 20 is a thin metallic plate 21, corresponding in size with said bar in regard to length and height, and between this plate and the bar the paper strip from roller 18 passes to roller 19, the space between the two being just sufficient for this purpose. (See Fig. 2.) This plate 21 is provided with a central longitudinal slot or opening 21$^a$, corresponding in size with the characters on the recording-wheels.

Formed with or secured to roller 19 or to its shaft is a ratchet-wheel 22, and pivoted to the front wall of the casing is a pawl 23, which engages with wheel 22 as the paper frame is oscillated, and thus feeds the paper. To the lower ends of the swinging bars 16 are secured the ends of the coiled springs 24, the other ends of the springs being secured to the casing. The rear of the money-drawer abuts against the swinging paper-frame when it is pushed in, thus forcing the frame backward, carrying the paper strip out of contact with the recording-wheel or characters thereon.

The money or cash drawer is designated by the numeral 25, and has passing centrally through it the horizontal bar 26, provided at its outer end with a handle 27, by which it may be rotated. The inner end of this bar is provided with a cross-plate 28, to the ends of which are secured or connected the transversely-reciprocating lock-bars 29 and 30, which pass through perforations in the sides of the drawer and engage with notches or slots in the sides of the casing, being held normally in their locked position by means of a coiled spring 31, one end of which is secured to the drawer, while the other is connected with one of the said bars. In one of the inner corners of the drawer is secured a gong 32, for indicating or sounding an alarm when the handle 27 is turned and the drawer opened.

33 designates the hammer for the gong mounted upon a vertical shaft 34, which is provided with a coiled spring 35, the tension of which causes the hammer to be actuated to sound the alarm. Secured to shaft 34 is an arm 36, which is in line with a slot 36$^a$ in the rear of the drawer. A projecting arm 37 strikes against the arm 36 when the door is closed, causing the shaft 34 to be rotated a short distance and the hammer drawn back. When the drawer is opened, arms 36 and 37 are thrown out of contact, which allows the hammer to be actuated to strike the gong.

The operation of the invention is as follows: The drawer being pushed in to its extreme limit, the bars 29 and 30 will be forced outward by the coiled spring 31 through the slots in the sides and into the notches of the casing, thus holding the drawer in a locked position. The apparatus is now ready for use, the rear of the drawer having pushed back the swinging paper-frame, carrying the paper strip out of contact with the recording-wheels. At the commencement of each day's work it is desirable that the date should be printed on the paper web for future reference. The pointer is therefore turned by means of the knob 38 on the shaft of dial 2 until it points to the proper month, "June." This will bring the corresponding character on the recording-wheel 13 into coincidence with the slot 21$^a$ of plate 21. Pointer of dial 3 is then turned until it points to the day of the month—say "20" on dial 2—which will bring a similar numeral on the recording-wheel into alignment with said slot 21$^a$ and with the character on the other recording-wheel designating the month. (See Fig. 1.) The drawer is now unlocked by turning the handle 27, which will rotate the rod 26, actuating the cross-plate 28 and withdrawing the bars 29 and 30 from the notches in the casing. The drawer is then pulled open, which causes an alarm to be sounded on the gong by means of the hammer 33, shaft 34, spring 35, and arm 36, the latter being released by arm 37. This pulling open of the drawer also causes the paper-frame to be swung forward by the coiled springs on the lower ends of the bars 16, and the web of paper where it registers with slot 21$^a$ in plate 21 being forced by means of springs 24 against the characters then appearing on the recording-wheels, said characters are printed on the web. There would thus be printed the characters "June 20." As the paper-frame is vibrated, the pawl 23 engages with the ratchet-wheel 22, thus causing the roller 19 to be moved and the paper strip to be fed thereby. The drawer is thus pushed in, the bar automatically locking the same, and the frame swung back.

The year "1889," or any other year desired, may be printed or recorded by turning said pointers respectively to the numerals "18" and "89" on dials 2 and 3. To draw a line under the characters thus printed, so as to separate them from the records of sales succeeding, turn both pointers to the points marked "Lines," when two short horizontal lines will be printed by opening the drawer, as above described.

It will be obvious that the sales can be recorded by turning the pointers to the proper figures or numbers on the respective dials, and then proceeding as before set forth.

At the lower part of the casing, on each side, are inwardly-projecting bars 40, in which are journaled the vertical inking-rollers 40$^a$, which are in contact with the characters on the recording-wheels, and by which they are inked.

From the above description it will be seen that my apparatus is exceedingly simple and compact and not liable to get out of order, and that it will automatically record the sales made, and at the same time indicate them on the dial in full sight of the party paying the same, thus adding to the security against dishonest practices on the part of employés.

The back or top of the casing may be hinged and provided with lock and key, so as to be opened to gain access to the working parts, if desired.

In the lower part of the casing are two horizontally-sliding bars 16$^a$ 16$^a$, with which the lower ends of the bars 16 are connected, and by which the paper-frame is oscillated by the movement of the drawer. A tension-spring 16$^b$ is connected with bars 16, and bears against the roller 19 to regulate its tension.

As an additional locking mechanism, I have devised the following: In a transverse plate 41 immediately in rear of the drawer is pivoted two levers 42 and 43, the outer ends of which engage with pins 44 on the vertical bars 45 46, having each a notch 47. These bars work in grooves in the uprights 48. Pivoted to plate 41 are two levers 49, the upper ends of which engage with the notches 47, while their lower ends engage with pins 50 on the locking-bars 29 and 30, said pins projecting through apertures 50$^a$ in the cross-plate 41, against which the inner end of the drawer abuts. The inner end of lever 42 is recessed or cut away, forming a wing 51. Lever 43 is provided with a projection 52, fitting under wing 51. Lever 42 is also provided with a beveled projection 54, against which the end of the cross-piece 28 strikes, and thereby raises the lever. 55 are springs for holding the levers in normal position. (Shown in Fig. 4.) On each recording-wheel is a pivoted disk 56, so located that when the pointers of the dials point to "Blank" said disks are immediately over and depress the vertical bars 45 46 by engaging with the projections 47$^a$ on each of said bars.

The operation is as follows: When the drawer is pushed in, the cross-bar 28 will be in the position shown by dotted lines in Figs. 3 and 4, and said cross-bar will strike the beveled projection 54, raising the lever 42. On releasing the handle 27 of the drawer the cross-piece 28 will assume the position shown in full lines, Fig. 6, and it will thus be seen that it will be impossible to release the cross-piece and open the drawer until the lever 43 is thrown out of engagement therewith. This is done by turning the pointer to "Blank," which will depress the bars 45 46 by means of the cams 56, which will raise the levers 45 46 and release the cross-piece. In the meanwhile the levers 49 will engage with the notches 47 and hold the said bars and levers in their last-named positions until the locking-bars are actuated to unlock the drawer, when the pins 50 on the bars 29 and 30 will strike the lower ends of the levers 49 and disengage the levers and allow the levers to again assume the position shown in full lines. It will be seen that the levers may be operated by either recording-wheel. It will also be noted that after the drawer has been closed it can only be opened or unlocked by turning one or both of the recording-wheels until the pointer of the dial registers at "Blank."

In practice I will place dials and pointers on the back of the apparatus as well as the front, so that the amounts registered may be viewed from either side.

Having thus described my invention, what I claim is—

1. In a cash registering and recording apparatus, the combination, with a dial having suitable characters thereon, a shaft having a pointer, and a recording-wheel on said shaft, having characters corresponding to the characters on the dial, of a swinging paper-frame, a drawer, and means, substantially as described, for bringing the paper carried by the frame into contact with the characters on the recording-wheel by opening the drawer of the apparatus, substantially as set forth.

2. The combination of the casing, the drawer, the dials having suitable characters thereon, the shafts and the pointers, the recording-wheels having characters thereon corresponding to the characters on the dials, but arranged in reverse order, the spring-pawls secured to the casing and engaging with notches in the recording-wheels, and the swinging frame carrying the paper web, actuated by the drawer, substantially as described.

3. The combination, with the casing, the drawer, the dials, the shafts and pointers, and the recording-wheels having characters thereon, of the swinging paper-frame consisting of the depending bars 16, secured to the pivoted cross-bar 17, the rollers 18 and 19, and transverse bar 20, substantially as described.

4. The combination, with the casing, the drawer, the dials, the shafts and pointers, and the recording-wheels, of the swinging paper-frame consisting of the depending bars 16, secured to the pivoted cross-bar 17, the rollers 18 and 19, the transverse bar 20, and the coiled springs 24, substantially as described.

5. The combination, with the casing, the drawer, the dials, the shafts and pointers, and the recording-wheels, of the swinging frame consisting of the bars 16, secured to the pivoted cross-bar 17, the rollers 18 and 19, the ratchet 22, pawl 23, and springs 24, substantially as described.

6. The combination, with the casing, the drawer, the dials, the shafts and pointers, and the recording-wheels, of the swinging paper-frame, consisting of the depending bars 16, rollers 18 and 19, transverse bar 20, and plate 21, having slot 21ª, substantially as described.

7. The combination, with the casing, the drawer, the dials, the shafts and pointers, and the recording-wheels, of the swinging paper-frame consisting of the depending bars 16, secured to pivoted cross-bar 17, the rollers 18 and 19, transverse bar 20, plate 21, having slot 21ª, ratchet-wheel 22, pawl 23, and the springs 24, substantially as described.

8. The combination, with the casing, the dials, the shafts and pointers, the recording-wheels, and the swinging paper-frame, of the drawer having the central horizontal bar 26, handle 27, cross-plate 28, reciprocating bars 29 and 30, passing through openings in the sides of the drawer, and the spring 31, substantially as described.

9. The combination, with the casing, the dials, the shafts and pointers, the recording-wheels, and the swinging paper-frame, of the drawer 25, provided with the central horizontal rod 26, handle 27, cross-plate 28, reciprocating arms 29 and 30, the spring 31, the gong 32, hammer 33, shaft 34, spring 35, and arm 36, engaging with arm 37, substantially as described.

10. The combination, with the casing, the dials, the recording-wheels, and the drawer, of the levers 42 43, the lever 42 having a beveled projection 54 and wing 51, and the lever 43 having a projection 52, the vertical bars 45 46, having projection 47ª, notch 47, the pivoted levers 49, the locking-bars having the pins 50, and the cams 56 on the recording-wheels, substantially as described.

In testimony that I claim the foregoing as my own I have hereunto affixed my signature in presence of two witnesses.

GEORGE M. ENYEART.

Witnesses:
SAMUEL C. MIDDAGH,
WILLIAM SHIELDS.